United States Patent [19]
Douglas et al.

[11] Patent Number: 5,705,915
[45] Date of Patent: Jan. 6, 1998

[54] METHOD FOR CHARGING A BATTERY

[75] Inventors: Twanika D. Douglas, Lawrenceville, Ga.; Joseph Patino, Pembroke Pines, Fla.; Michael D. Geren, Duluth, Ga.; William R. Williams, Coral Springs, Fla.

[73] Assignee: Motorola, Inc., Schaumburg, Ill.

[21] Appl. No.: 805,836

[22] Filed: Mar. 3, 1997

[51] Int. Cl.⁶ .......................... H01M 10/44; H01M 10/46
[52] U.S. Cl. .................................. 320/31; 320/35
[58] Field of Search .................... 320/5, 21, 29, 320/30, 31, 35, 36, 37, 38

[56] References Cited

U.S. PATENT DOCUMENTS

| | | | |
|---|---|---|---|
| 2,662,211 | 12/1953 | Marko et al. | 324/29 |
| 2,864,055 | 12/1958 | Koresch et al. | 324/29 |
| 3,288,642 | 11/1966 | Kordesch | 136/14 |
| 3,531,706 | 9/1970 | Mullersman | 320/20 |
| 3,534,241 | 10/1970 | Wilson et al. | 320/33 |
| 3,538,415 | 11/1970 | Wilson | 320/32 |
| 3,852,652 | 12/1974 | Jasinski | 320/35 |
| 3,886,428 | 5/1975 | Macharg | 320/39 |
| 3,987,353 | 10/1976 | Marcharg | 320/39 |
| 4,270,080 | 5/1981 | Kostecki | 320/24 |
| 4,503,378 | 3/1985 | Jones et al. | 320/20 |
| 4,639,655 | 1/1987 | Westhaver | 320/14 |
| 4,756,852 | 7/1988 | Martin | 320/20 |
| 4,767,977 | 8/1988 | Fasen et al. | 320/20 |
| 4,806,840 | 2/1989 | Alexander et al. | 320/20 |
| 5,122,722 | 6/1992 | Goedken et al. | 320/22 |
| 5,412,306 | 5/1995 | Meadows et al. | 320/20 |
| 5,493,198 | 2/1996 | Kamke | 320/35 X |
| 5,510,693 | 4/1996 | Theobald | 320/24 |
| 5,548,201 | 8/1996 | Grabon | 320/35 |

OTHER PUBLICATIONS

Technical Notes entitled Charging Method for Batteries, Using the Resistance–Free Voltage as Endpoint Indication, Kordesch, K. V. no date.

*Primary Examiner*—Edward Tso
*Attorney, Agent, or Firm*—Kenneth M. Massaroni; Kelly A. Gardner

[57] ABSTRACT

A method for charging a battery or battery pack (206) provides a scheme for terminating a rapid charging regime only after both a temperature and voltage threshold are exceeded. This allows a battery to continue to receive a rapid charge even when battery temperatures are rising rapidly due to external (non-charge related) conditions.

8 Claims, 2 Drawing Sheets

METHOD FOR CHARGING A BATTERY

TECHNICAL FIELD

This invention relates in general to battery charging techniques and more specifically to a method for charging a battery more efficiently.

BACKGROUND

Many battery chargers today use a dual rate charge sequence in which the battery under charge is charged at a fast rate for a period of time and then the battery is charged at a slower or "trickle" rate once the battery has reached a predetermined charge level. During the charging of a rechargeable battery such as nickel cadmium, nickel metal hydride, or lithium battery, most rapid charge termination sequences (the time when the charger switches from the rapid charge rate to the trickle or slower charge rate) are activated either by looking at the rising temperature of the battery over a predetermined period of time ($\Delta T$ Method), or the change in the battery voltage over a given period of time ($\Delta V$ Method). Both the $\Delta T$ and $\Delta V$ methods of charge rate switching have found widespread acceptance in the marketplace. However both are subject to inaccuracy and errors under certain circumstances.

For example, when a battery charger is used in a vehicle application, for example, a police patrol car, a fire truck, or even a vehicular charger for a cellular phone, rising temperatures, due to high vehicle interior temperature conditions, occasioned by sunlight, or summer temperatures, can cause a premature switch under the $\Delta T$ method. This is due to the fact that the $\Delta T$ method looks for excessive change in temperature over a predetermined period of time. In environments in which the temperatures are exceedingly high, (i.e., a car interior in Phoenix during August), the temperatures of the battery pack under charge may rise more rapidly than the predetermined threshold, not as a result of a charging, but rather as a result of being exposed to higher ambient temperatures. The result would be that the charger switches from the rapid charge regime to a slower charger regime prematurely.

Indeed, under simulated circumstances, the rapid charge regime can terminate in as little as fifteen minutes when over ninety minutes might be necessary to fully recharge the battery under charge. Accordingly, from the standpoint of the user, an undercharged battery is undesirable as the radio or telephone to which it is attached will not perform in an optimum fashion.

Accordingly, there exists a need for a charging scheme, and in particular, a charge termination method, in which termination of the rapid charging regime occurs at the proper time, regardless of ambient temperatures. The improved method should continue to look at changes in temperature, but also consider other criteria in order to make the best determination of when rapid charging should be terminated.

DETAILED DESCRIPTION OF THE PREFERRED EMBODIMENT

Figure 1:
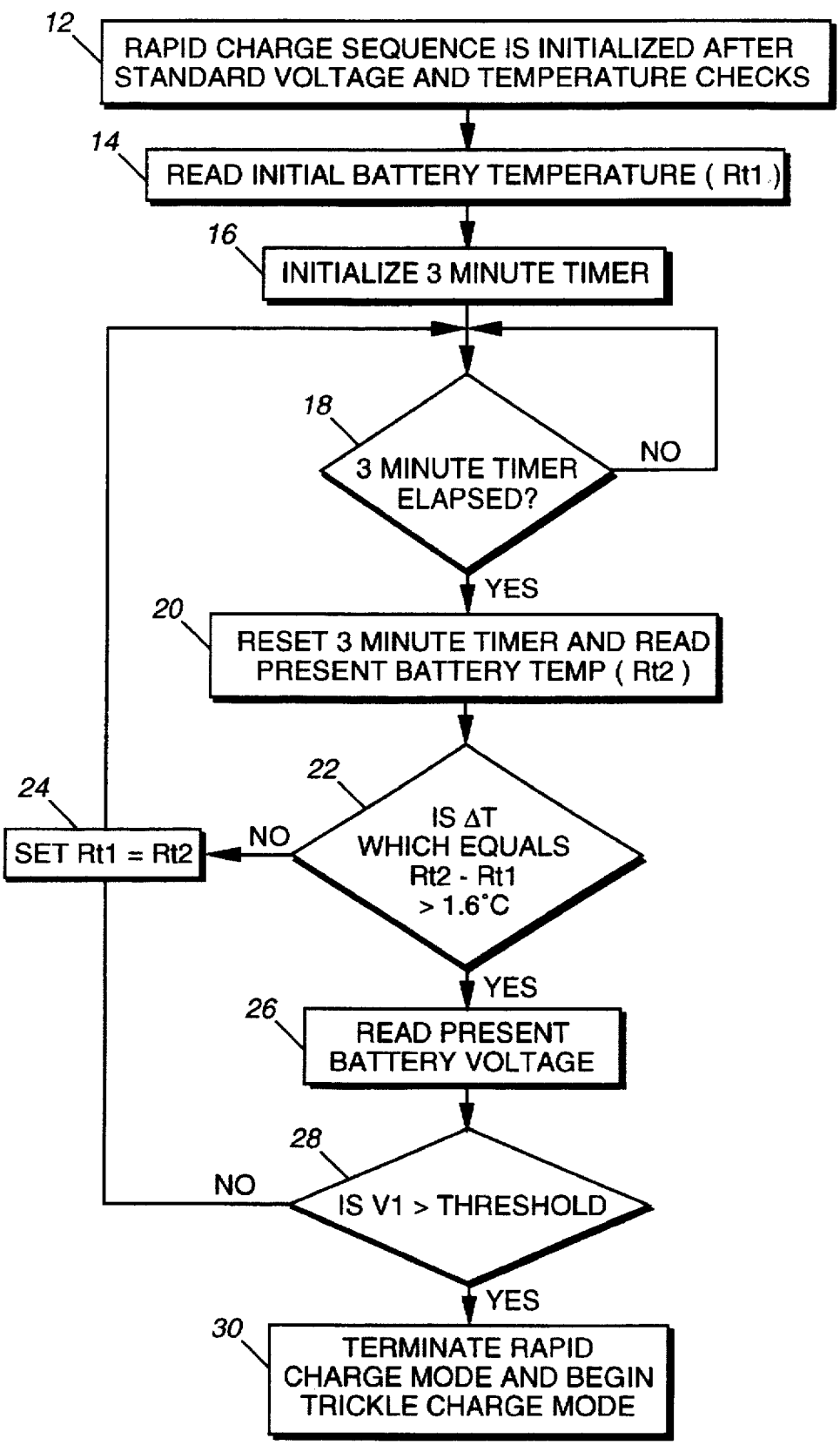
FIG. 1 is a flowchart of a charging sequence in accordance with the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a flowchart showing a battery charge regime or sequence in accordance with the instant invention. The flowchart illustrates at step 12, the first step in the charging regime. Step 12 describes the initialization of the rapid charge sequence after the charging device takes a standard voltage and temperature check of the battery pack inserted into a charger. Thereafter, as is illustrated at step 14, the battery charging device would read the initial battery temperature (Rt1) in order to establish a baseline temperature for the battery which has been inserted into the charger. Thereafter, at step 16, the battery charger will initialize a three-minute timer. The three-minute timer is designed to assure that the temperature of the battery is sampled during regularly spaced intervals in the charging sequence. Accordingly, as illustrated by step 16, the battery temperature will be taken every three minutes during the rapid charging regime. While three minutes is specified in step 16, it is to be understood that the battery temperature may be sampled more or less often than that. Three minutes has been selected in this embodiment simply because, in the opinion of the inventors, it represents the best time period for measuring the temperature of the battery.

Thereafter, as is illustrated at step 18, the charging device continues to monitor whether the three-minute timer has elapsed. If the three-minute time has not elapsed, the charger continues to charge in the rapid charge regime. However, if the three-minute timer has elapsed, then, as is illustrated at step 20, the battery temperature is read and a new battery temperature (Rt2) is established. At this point, the three minute timer is reset and the next three minute period is commenced.

After measuring temperature (Rt2) the battery charger will then compare temperature Rt2 to Rt1 as is illustrated by step 22. Specifically, at step 22, the charging device will check to see if the temperature change during the previous three-minute time interval exceeds a preselected temperature threshold valve. This is done by comparing temperature Rt2 to temperature Rt1, thus establishing what the change in temperature was, and then comparing it to a preselected temperature threshold value. In the embodiment illustrated in FIG. 1, wherein the time interval between temperature checks is three minutes, the preselected temperature threshold value is approximately 1.6° centigrade. It is to be understood, however, that with different batteries and with different conditions, a different preselected temperature threshold value may be used.

If at step 22 it is determined that Rt2 minus Rt1 is not greater than the preselected temperature threshold value, then the charging device will reset Rt1 so that it now equals the most recent temperature (i.e., Rt2) as is illustrated in Step 24. The charger then returns to the step in the process immediately prior to step 18 and waits for another three-minute interval to elapse before the temperature of the battery is then measured in steps 18, 20 and 22 are repeated.

If, however, Rt2 less Rt1 is greater than the preselected threshold temperature value as illustrated in step 22, then the charger proceeds to read the present battery voltage (V1) as illustrated in step 26. It is well known in the battery field, that as a battery approaches full charge, the voltage of the battery begins to rise fairly dramatically. Likewise, when a battery approaches a full charge, the temperature of the battery goes up dramatically. However, as described hereinabove, situations can be produced in which a false temperature increase, not attributable to charging of the battery, can cause the rapid charging regime of a battery charger to be terminated prior to such time as charging is complete. Accordingly, in the example in which a battery is placed in a very hot automobile for charging, the battery may appear to the charger to be fully charged due to temperature rise. However, this temperature rise may be due solely to the fact that the temperature of the automobile is substantially greater than the temperature of the battery. Accordingly, the present method provides the steps illustrated at steps 26, 28 and 30 in order to overcome this problem.

After having surpassed the preselected temperature threshold value in step 22, the battery charger will at step 26 read the present battery voltage V1. If the battery voltage is below the preselected voltage threshold value as illustrated in step 28, the charger will determine that the temperature rise is due to some environmental factor and not due to the battery having reached a substantially fully charge state. Accordingly, the battery charger will then reset Rt2 to Rt1 as is illustrated in step 24, and allow the battery charger to remain in rapid charging mode. The entire process returns to the point in time prior to step 18 in FIG. 1. The battery charger will continue to charge the battery in a rapid charge mode as per steps 18–28 until such time as the measured battery voltage is greater than the preselected voltage threshold value as is illustrated in step 28. Once this occurs, the battery charger will then determine that the battery has reached a substantially fully-charged state, and terminate the rapid charge regime as is illustrated in step 30. The charger may also at this time initiate the trickle charge mode in order to assure that the battery maintains its substantially fully-charged state. The preselected voltage threshold value is typically between 9 and 10 volts for nickel based rechargeable batteries (i.e., NiCd and nickel metal hydride batteries) but may vary with other battery chemistries.

The method illustrated in the flowchart of FIG. 1 may be implemented in many different types of battery chargers. Indeed, many battery chargers presently on the market have the ability to measure either changes in temperature, changes in voltage, or both. However, due to cost and other factors, only one criteria is typically measured. Indeed, it is typically the case that many batteries already, have means for measuring their temperatures and passing that information to a charger during the charging regime. Temperature measurement is a function of the battery thermistor which is often placed inside a battery pack and is coupled to the charger via one or more contacts on the pack.

Figure 2:
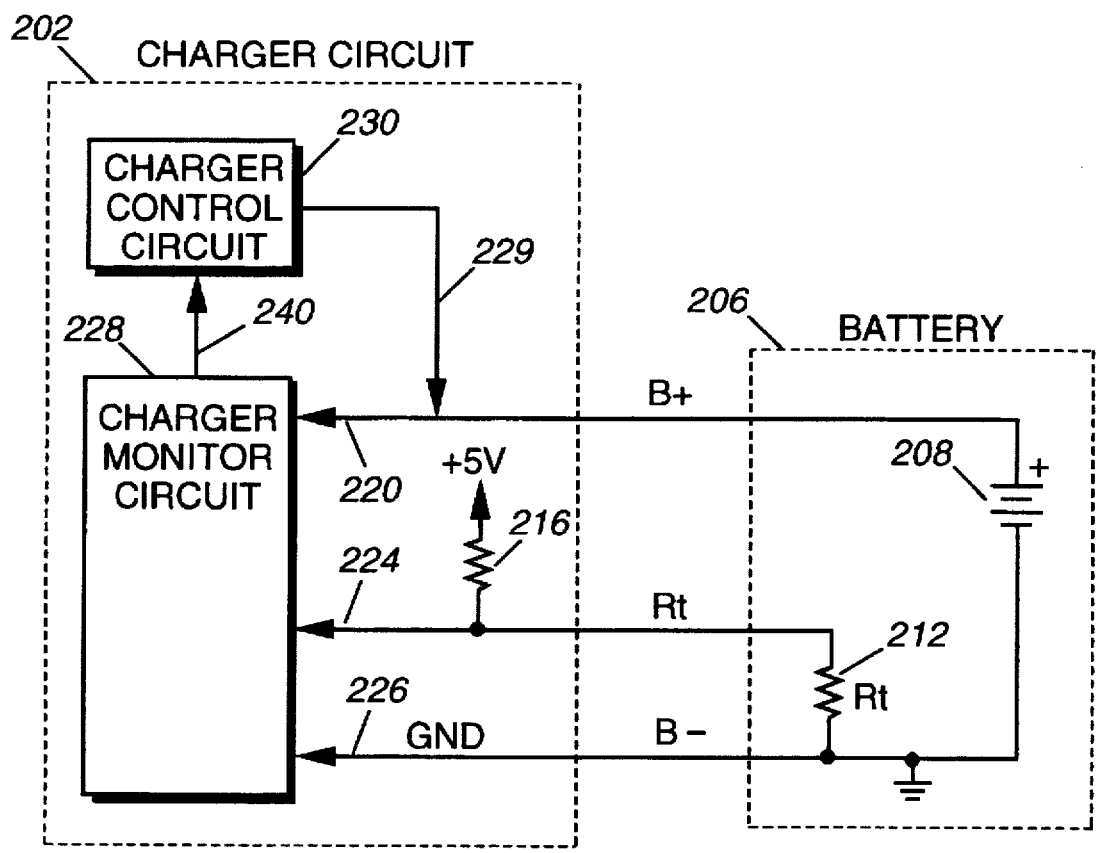
FIG. 2 is a simplified block diagram of a battery pack and battery charger for implementing a charging sequence, in accordance with the invention.

Referring now to FIG. 2, there is shown therein a simplified block diagram of a battery charging system 200 consisting of a charger 202 and a battery pack 206 in accordance with the present invention. The battery pack 206 contains one or more battery cells 208 which determine the voltage and charge capacity of the battery pack 206. Also, included as part of the battery pack 206 is a battery temperature indicator such as a thermistor 212 for determining the temperature of the battery being charged. The thermistor 212 allows the battery charger to measure the changes in battery temperature in order to evaluate whether or not to terminate rapid charging as described in FIG. 1. Alternatively, the thermistor can be placed in the battery charger 202 in a location adjacent the inserted battery pack.

Charger 202 consists of a charger monitor circuit 228 which can consist of a microprocessor or microcontroller such as is well known in the art, and appropriate control software in order to implement the rapid charge termination scheme of the present invention. Charger monitor circuit 228 controls charger control circuit 230 which provides current to battery pack 206 in order to charge the battery cells 208. Charger control circuit 230 can be implemented as a programmable variable current source circuit as is well known in the art. A control signal is transmitted by Charger control monitor 228 to charger control circuit 230 via bus 240. The control signal informs charger control circuit 230 on how much current to source the line 229 to battery pack 206.

Charger monitor circuit 228 contains three analog to digital (A/D) ports 220, 224 and 226. The A/D port 220 monitors voltage on the B+ line while A/D port 224 senses the resistance of the thermistor 212 in order to monitor the battery for changes in temperature. A/D port 224 includes an external pull-up resistor 216 which is used to help determine the thermistor resistance 212 by determining the voltage level of A/D port 224. Using a battery charging device with a battery such as is illustrated in FIG. 2, allows one to implement the rapid charging scheme in FIG. 1.

The present invention provides for more efficient charging batteries while providing different charge levels for batteries depending on the condition of the battery. Moreover, the rapid charging of the battery continues to be applied to the battery even when the temperature change in the battery is greater than the preselected temperature threshold level. This is due to the fact that it is possible for temperature to change as a function of external or ambient conditions and not a function of the charging itself. This not only provides for better and more efficient charging of batteries, but also can reduce wear and tear on batteries by ensuring that they are properly charged in the first instance, as opposed to being only partially charged before the battery is subjected to drainage by use in a radio or telephone.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of charging an electrochemical cell comprising the steps of:

determining an initial cell temperature and voltage level;

initiating a rapid charging regime;

measuring the temperature of the cell at regular intervals after initiating said rapid charging regime to determine temperature increases in said cell between each regular interval;

measuring battery voltage if the temperature increase in any one regular interval exceeds a preselected temperature threshold value; and terminating said rapid charging regime if the measured battery voltage exceeds a preselected voltage threshold value.

2. A method as in claim 1, wherein battery temperature is measured at three minute intervals.

3. A method as in claim 1, wherein battery voltage is measured when the temperature increase for any one regular interval exceeds 1.6° C.

4. A method as in claim 1, wherein the preselected voltage threshold value is between 9 and 10 volts.

5. A method of determining the endpoint of a rapid charging regime for a battery cell in a battery charging device, said method comprising the steps of:

measuring temperature increase of said battery cell at regular intervals during said rapid charging regime;

measuring battery voltage if the temperature increase of said battery during any regular interval exceeds a preselected temperature threshold value; and terminating the rapid charging regime if the measured battery voltage exceeds a preselected voltage threshold value.

6. A method as in claim 5, wherein battery temperature is measured at three minute intervals.

7. A method as in claim 5, wherein battery voltage is measured when the temperature increase for any one regular interval exceeds 1.6° C.

8. A method as in claim 5, wherein the preselected voltage threshold value is between 9 and 10 volts.

* * * * *